No. 12,289. REISSUED NOV. 22, 1904.
H. E. SHARPS & W. F. COOPER.
AUTOMATIC SPRING WINDING MECHANISM FOR MECHANICAL MUSICAL INSTRUMENT DEVICES.
APPLICATION FILED JAN. 29, 1904.
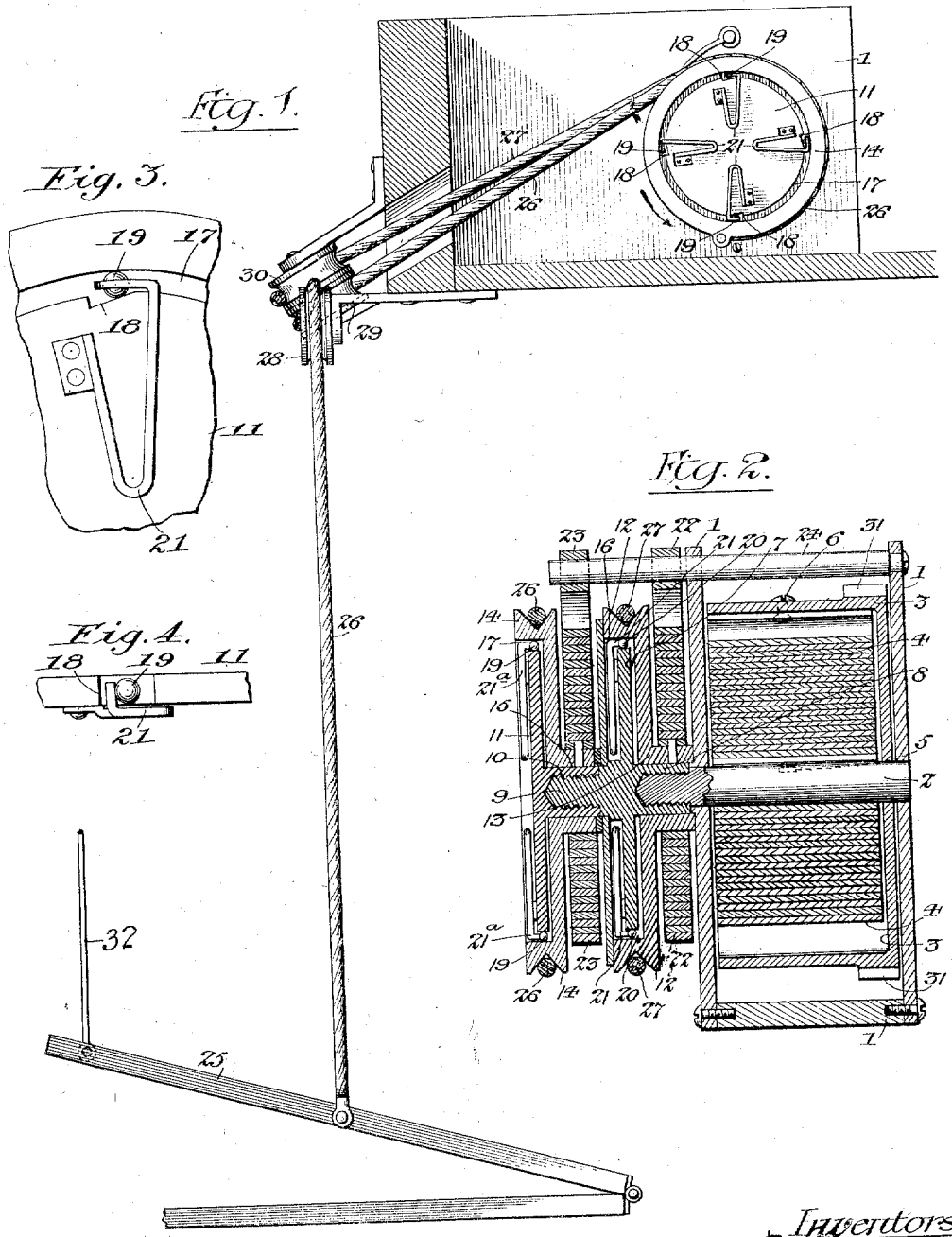
Witnesses:
Louis M. T. Whitehead
Fred G. Fischer
Inventors:
William F. Cooper
Herbert E. Sharps
by Burton & Burton
their attys No. 12,289. Reissued November 22, 1904.

UNITED STATES PATENT OFFICE.

HERBERT E. SHARPS AND WILLIAM F. COOPER, OF CHICAGO, ILLINOIS, ASSIGNORS, BY MESNE ASSIGNMENTS, TO THE CABLE COMPANY, OF CHICAGO, ILLINOIS, A CORPORATION OF ILLINOIS.

AUTOMATIC SPRING-WINDING MECHANISM FOR MECHANICAL MUSICAL-INSTRUMENT DEVICES.

SPECIFICATION forming part of Reissued Letters Patent No. 12,289, dated November 22, 1904.

Original No. 697,754, dated April 15, 1902. Application for reissue filed January 29, 1904. Serial No. 191,224.

*To all whom it may concern:*

Be it known that we, HERBERT E. SHARPS and WILLIAM F. COOPER, citizens of the United States, both residing at Chicago, in the county of Cook and State of Illinois, have invented new and useful Improvements in Automatic Spring-Winding Mechanism for Mechanical Musical-Instrument Devices, of which the following is a specification, reference being had to the accompanying drawings, forming a part thereof.

Our invention relates to automatic spring-winding mechanism for mechanical musical-instrument devices, and has for its object to provide an improved and simple automatic winding mechanism for winding and keeping wound a spring-motor to be applied to the rolling and rerolling of a perforated tune-sheet for automatic musical instruments and automatic musical attachments.

With these ends in view our invention consists in certain details of construction and combination of parts, such as will be hereinafter fully set forth and then specifically be designated by claims.

In the accompanying drawings, which form a part of this application, Figure 1 is a view, partly in side elevation and partly in section, showing our improvement; and Fig. 2, a sectional elevation of the spring-motor and winding-spring in their proper assembled positions. Fig. 3 is a detail view of a portion of the winding devices shown in Fig. 1, on an enlarged scale, designed to show the friction-clutch device. Fig. 4 is a detail edge view of the disk and clutch device shown in Fig. 3.

Similar numbers of reference denote like parts in all the figures of the drawings.

1 is any suitable and ordinary casing, within which is journaled the motor-shaft 2. 3 is a drum hung loosely around this shaft inside the casing, and 4 is the motor-spring, the inner end of which is secured to the shaft 2 by any suitable means, as a screw 5; (shown in dotted lines,) while the outer end of said spring is secured to the wall of the drum by any suitable means, such as a screw 6.

7 is a disk having one of its hubs, 8, secured to the shaft 2, while to the other hub, 9, of this disk is secured the hub 10 of a second disk 11, so that it will be clear that the shaft 2 and disks 7 11 are rigidly secured together, so as to revolve in harmony.

12 is a wheel whose hub 13 is loosely journaled on the hub 8, and 14 is a similar wheel whose hub 15 is loosely journaled on the hub 11. The wheels 12 14 are recessed or cut away at one side, as shown at 16 and 17 in each instance, and the disks 7 11 extend within these recessed portions, so that the peripheries of the disks are very close to the inner peripheries of the recesses. The peripheries of these disks are provided with little wedge-shaped pockets 18, as shown at Fig. 1 in the instance of the disk 11, and resting within these pockets of this disk 11 are little balls 19, while corresponding balls 20 rest within the pockets of the disk 7. The diameter of these balls is greater than the width of the space between the peripheries of the disks and the peripheries of the recesses 16 17 at all points except where these pockets are located, so that it will be clear that when the wheels are turned in the direction of the arrow, as shown at Fig. 1, there will be no wedging or binding between these wheels and disks; but when said wheels are turned in a reverse direction the balls will be wedged tightly between the peripheries of the disks and recesses, and thereby cause the wheels and disks to revolve in harmony. Small springs 21 21 are secured to the sides of the disks, the extremities of these springs being extended behind the balls, so as to normally keep the latter away from the widest portions of the pockets, and this will insure an instant binding or clutching between the disks and wheels when the latter are turned in the direction reverse to that of the arrow in Fig. 1. This construction and arrangement of ball-clutch is not new, but is an expedient commonly known, and we therefore do not wish to be understood as laying any claim thereto, since any suitable clutch mechanism will answer the purposes of our invention, although we prefer the form shown and described.

22 and 23 are the winding-springs, whose inner ends are secured to the hubs 13 15 of the wheels 12 14, while the outer extremities of these springs are secured to any suitable pin 24, which extends from the casing 1. The springs 4, 22, and 23 are the usual volute springs, and the springs 22 23 are each stronger than the spring 4, and the springs 22 23 are wound in a direction reverse to the direction in which the spring 4 is wound, and when the wheels are turned in the direction indicated by the arrow at Fig. 1 the springs 22 23 will be wound, so that they will impart to the hubs of the wheels a tendency to revolve in a direction reverse to that indicated by the arrow. Therefore should the wheels be turned in the direction indicated by the arrow and then released the springs 22 23 would cause the wheels and shaft 2 to revolve in a direction reverse to that indicated by said arrow and the motor-spring 4 would be wound. The wheels are each connected with any suitable treadle or pedal device, so that at the power-stroke of such treadle or pedal the corresponding wheel will be turned in the direction indicated by the arrow, so as to wind the corresponding spring 22 or 23, while at the return movement of such pedals or treadles, respectively, the motor-spring will be wound by the action of the more powerful springs 22 23.

It is of course immaterial as to what form of pedal or treadle or connecting means is utilized in connection with our invention, and we have therefore shown an ordinary form of pedal 25, connected to the wheels by means of cables or cords 26 27. One of these cords, 26, being shown at Fig. 1, is connected with the treadle and passed over suitable pulleys 28 29 and then attached to the periphery of the wheel 14. The cord 27 is of course connected at one end with the periphery of the wheel 12 and then passed over a pulley 30 and another pulley similar to the pulley 28 (but not shown) and attached to the other treadle or pedal. It will be understood that the two pedals will be operated in the usual manner—*i. e.*, being depressed alternately, one being held down while the other is rising—and it will be understood also that the clutch device in each of the wheels 12 and 14 operates as a detent, preventing the reverse movement of the shaft 2 and disks 7 and 11 during the reverse movement of the other of said wheels corresponding to the rising movement of the pedal with which it is connected. We have shown and described two of these wheels and two sets of the more powerful springs, since this is an advantageous construction. We do not wish, however, to be limited to this double construction, since other and familiar detent means to hold the winding action gained at each stroke may be used without departing from the main or essential feature of our invention.

The drum 3 carries a gear 31, which meshes with the usual train of gears, by means of which the unrolling of the perforated tune-sheet is effected, and the transferring of the power of the motor-spring to the usual re-winding-roll is accomplished by the ordinary gear-shifting mechanism, which we have not shown and which will require no illustration or description herein.

It will be understood that an important purpose of the springs 22 and 23, arranged so as to wind the motor-spring by reacting from the winding to which they are subjected by the pedal connections, is to avoid the danger of overwinding the motor-spring which arises when such motor-spring is wound by direct action of the pedals, which are operated primarily for pumping the bellows and which for that purpose may require to be operated much more than would be necessary for keeping the motor-spring wound, and in the drawings, therefore, the pedal 25, which is shown, has a connecting-rod 32, and it will be understood that both pedals are similarly provided in this respect and that said rods 32 would extend to and operate the pumper-bellows. (Not shown.)

There are several forms of spring-motors that are used in automatic piano-players, and we have illustrated a well-known form of motor in which the motor-spring winds continuously. Also spring-motors are commonly used in which no drum whatever is employed, one extremity of the motor-spring being connected in any suitable and ordinary manner with the perforated tune-sheet-unrolling devices. We therefore do not wish to be limited to any particular form of spring-motor, since the gist of our invention resides in the broad idea of winding the motor-spring by means of the action of a more powerful spring at the return movement of the pedal.

Having thus described our invention, what we claim as new, and desire to secure by Letters Patent, is—

1. In an automatic spring-winding mechanism for mechanical musical-instrument devices, the combination with the pumper-operating pedal of the instrument, of a motor-spring; mechanism operated thereby for unrolling the perforated tune-sheet; a rotatable element connected to one end of said spring for winding the latter by rotation of said element; a wheel capable of revolution independently of said element; a slip-and-grip clutch connecting such wheel and rotatable element adapted to grip in the direction for winding the motor-spring; a spring relatively more powerful than the motor-spring, having one end secured to a stationary element and the other end connected with said wheel, and means by which the pedal, in its power-stroke, rotates the wheel in direction for tightening the more powerful spring, said direction being the direction for slipping said clutch.

2. In an automatic spring-winding mechanism for mechanical musical-instrument devices, in combination with the pumper-operating pedals of the instrument, a motor-spring, and mechanism actuated thereby for unrolling the perforated tune-sheet; a rotatable element to which said spring is connected for winding the spring by the rotation of such element; two wheels, each capable of revolution about the same axis independently of said motor-spring-winding element; slip-and-grip clutches by which said wheels respectively are connected with said element, adapted both to grip in direction for winding the motor-spring; two springs, each relatively more powerful than the motor-spring, each having one end connected with a fixed support, said springs having their other ends connected respectively with said wheels; means connecting the pedals with said wheels respectively for rotating the latter by the power-stroke of the pedals in direction for slipping the clutches and for tightening the more powerful springs.

3. In an automatic spring-winding mechanism for mechanical musical-instrument devices, the combination of a motor-spring, mechanism operated thereby for unrolling the perforated tune-sheet; a rotatable element connected to the one end of said spring for winding the latter by rotation of said element; a wheel capable of revolution independently of said element; a slip-and-grip clutch connecting such wheel and rotatable element adapted to grip in the direction for winding the motor-spring; a spring relatively more powerful than the motor-spring, having one end secured to a stationary element and the other end connected with said wheel, and means for rotating the wheel in direction for tightening the more powerful spring, said direction being the direction for slipping said clutch.

4. In an automatic spring-winding mechanism for mechanical musical-instrument devices, in combination with a motor-spring, and mechanism actuated thereby for unrolling the perforated tune-sheet; a rotatable element to which said spring is connected for winding the spring by the rotation of such element; two wheels, each capable of revolution about the same axis independently of said motor-spring-winding element; slip-and-grip clutches by which said wheels respectively are connected with said element, adapted both to grip in direction for winding the motor-spring; two springs, each relatively more powerful than the motor-spring, each having one end connected with a fixed support, said springs having their other ends connected respectively with said wheels; means for rotating the latter in direction for slipping the clutches and for tightening the more powerful springs.

5. In an automatic spring-winding mechanism for mechanical musical-instrument devices, the combination of the stationary casing; the shaft journaled within said casing; the motor-spring having its inner and outer extremities respectively secured to said shaft and to the mechanism by means of which the unrolling of the perforated tune-sheet is effected; a wheel capable of revolution independent of said shaft; a spring relatively more powerful than the motor-spring and having its inner and outer extremities respectively secured to said wheel and to a stationary element; means secured to said wheel for revolving the latter in the direction for winding the more powerful spring, and a clutch by which said wheel, when revolved in reverse direction, will be rigidly connected with said shaft for winding the motor-spring upon reverse movement of said wheel.

6. In an automatic spring-winding mechanism for mechanical musical-instrument devices, the combination of the stationary casing; the shaft journaled within said casing; a motor-spring having its inner and outer extremities respectively secured to said shaft and to the mechanism by means of which the unrolling of the perforated tune-sheet is effected; a wheel capable of revolving independent of said shaft; a spring relatively more powerful than the motor-spring and having its inner and outer extremities respectively secured to said wheel and to a stationary element, said springs being wound in reverse directions; the pedal; a connection between said wheel and pedal whereby the power-stroke of the latter will revolve said wheel in one direction and wind said powerful spring, and a clutch carried by said shaft and adapted to engage with said wheel on its reverse movement whereby at the return stroke of the pedal said powerful spring will effect this reverse movement of the wheel and thereby wind the motor-spring, substantially as set forth.

7. In an automatic spring-winding mechanism for mechanical musical-instrument devices, the combination of the stationary casing; the shaft journaled within said casing; the motor-spring having its inner and outer extremities respectively secured to said shaft and to the mechanism by means of which the unrolling of the perforated tune-sheet is effected; the clutches moving in harmony with said shaft; wheels on the shaft capable of independent rotation in one direction; the springs which are each relatively more powerful than the motor-spring, and which are each wound in a direction reverse to that of said motor-spring and whose inner and outer extremities are respectively secured to said wheels and to a stationary element; the pedals, and connections between said wheels and pedals whereby the power-strokes of the latter will effect the free rotations of said wheels thereby winding the powerful springs, while at the return movements of said pedals the relaxation of said powerful springs will effect the engagement of said clutches and wheels and cause the latter to revolve in a reverse direction thereby winding the motor-spring, substantially as set forth.

8. In an automatic spring-winding mechanism for mechanical musical-instrument devices, the combination of the stationary casing; the shaft journaled within said casing; the drum loosely carried by said shaft; the motor-spring whose inner and outer extremities are respectively secured to said shaft and drum; a wheel capable of revolving independent of said shaft; a spring relatively more powerful than the motor-spring and having its inner and outer extremities respectively secured to said wheel and to a stationary element, said springs being wound in reverse directions; the pedal; a connection between said wheel and pedal whereby the power-stroke of the latter will revolve said wheel in one direction and wind said powerful spring, and a clutch carried by said shaft and adapted to engage with said wheel on its reverse movement whereby at the return stroke of the pedal said powerful spring will effect this reverse movement of the wheel and thereby wind the motor-spring, substantially as set forth.

9. In an automatic spring-winding mechanism for mechanical musical-instrument devices, the combination of a motor-spring; mechanism operated thereby for unrolling the perforated tune-sheet; a rotatable element connected to one end of said spring for winding the latter by rotation of said element; a wheel capable of revolution independently of said element; a slip-and-grip clutch connecting such wheel and rotatable element adapted to grip in the direction for winding the motor-spring; a spring relatively more powerful than the motor-spring, having one end secured to said wheel and the other to a stationary element and coiled about the axis of said wheel; means secured to said wheel for rotating the wheel in the direction for winding the more powerful spring, said direction being the direction for slipping said clutch.

10. In an automatic spring-winding mechanism for mechanical musical-instrument devices, the combination with a motor-spring and mechanism actuated thereby for unrolling the perforated tune-sheet; a rotatable element to which said spring is connected for winding the spring by the rotation of such element; a wheel capable of revolution independently of such motor-spring-winding element; a slip-and-grip clutch connected with such wheel and motor-spring-winding element adapted to grip in direction for winding the motor-spring; a helical spring relatively more powerful than the motor-spring, having its inner and outer extremities respectively secured to said wheel and to a fixed support; means secured to said wheel for rotating the latter in the direction for winding the more powerful spring and slipping the clutch.

11. In an automatic spring-winding mechanism for mechanical musical-instrument devices, the combination with a motor-spring, and mechanism by which it operates the tune-sheet; a rotary element connected to such motor-spring for winding the spring by the rotation of such element; two wheels, each capable of revolution about the same axis independently of said motor-spring-winding element; slip-and-grip clutches by which said wheels respectively are connected with said element, adapted to grip in direction for winding the motor-spring; two springs, each relatively more powerful than the motor-spring, coiled about the axis of said wheels, each having one end connected with one of said wheels, and the other with a fixed support; pedals; means connecting them with said wheels respectively for rotating the latter by the power-stroke of the pedals in direction for slipping the clutches and winding said more powerful springs.

In testimony whereof we hereunto set our hands, in the presence of two witnesses, at Chicago, Illinois, this 6th day of January, 1904.

HERBERT E. SHARPS.
WILLIAM F. COOPER.

Witnesses:
CHAS. S. BURTON,
FREDK. G. FISCHER.